C. ROBBINS.
GEAR HOUSING FOR MEAT CRUSHERS.
APPLICATION FILED APR. 2, 1918.

1,376,585.

Patented May 3, 1921.

Witnesses.

Inventor
C. Robbins.

By
Attorneys

UNITED STATES PATENT OFFICE.

CHARLES ROBBINS, OF LAWRENCEVILLE, ILLINOIS.

GEAR-HOUSING FOR MEAT-CRUSHERS.

1,376,585.  Specification of Letters Patent.  Patented May 3, 1921.

Application filed April 2, 1918. Serial No. 226,181.

*To all whom it may concern:*

Be it known that I, CHARLES ROBBINS, a citizen of the United States, residing at Lawrenceville, in the county of Lawrence, State of Illinois, have invented certain new and useful Improvements in Gear-Housings for Meat-Crushers; and I do hereby declare the following to be a full, clear, and exact description of the invention, such as will enable others skilled in the art to which it appertains to make and use the same.

The present invention relates to new and useful improvements in pressure applying devices such as meat crushers adapted for household use and comprising a frame adapted to be secured to a suitable support, and carrying a pair of toothed rollers between which a steak or other piece of meat may be passed, to crush the same and thus tear the fibers thereof to make it more tender, and to provide series of indentations in the surface of the meat which assists in cooking the meat.

It is in general the object of the present invention to simplify and otherwise improve the structure and to increase the efficiency of devices of this character, and it is more particularly an object to provide an exceedingly simple and sufficiently strong frame for supporting the meat tendering rollers, which may be most readily assembled and disassembled, and which has its parts so arranged that securement of the frame to a support utilizes said support as a brace means to prevent possible tendency to distortion of the frame due to operating stresses set up therein.

It is the specific object of the invention to provide a gear housing and means for actaching it to one end plate of the frame without the necessity for attaching elements thereon other than the parts of the frame itself and the driving crank.

With the above and other objects and advantages in view the invention resides more particularly in the novel combination, form and arrangement of parts hereinafter described and pointed out in the appended claims.

In the accompanying drawings:—

Figures 1, 2:
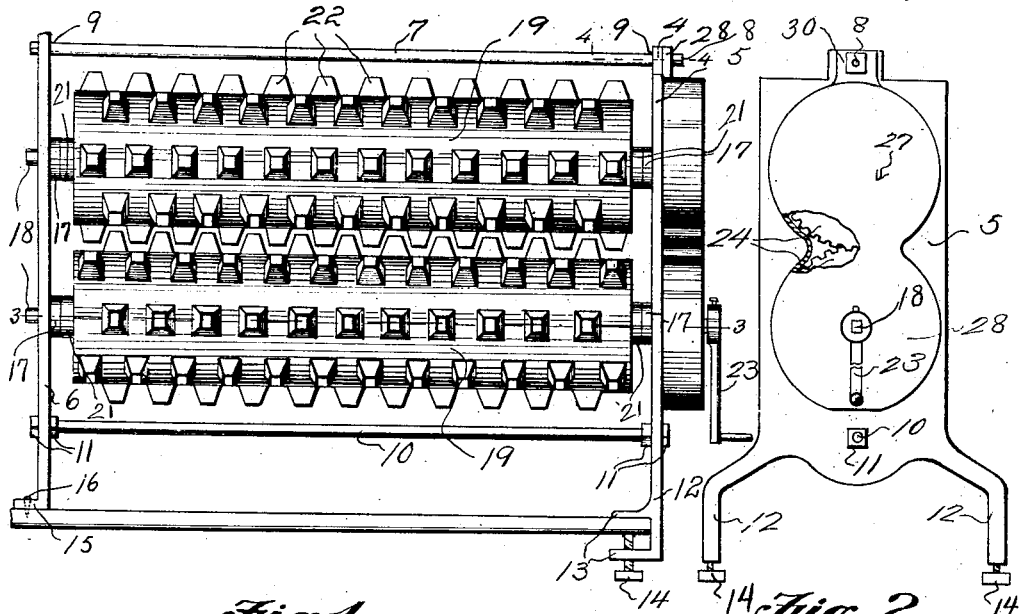
Figure 1 is an elevational view of a meat crusher embodying the present invention and secured to a table top or similar support.
Fig. 2 is an end view thereof.
Figure 3:
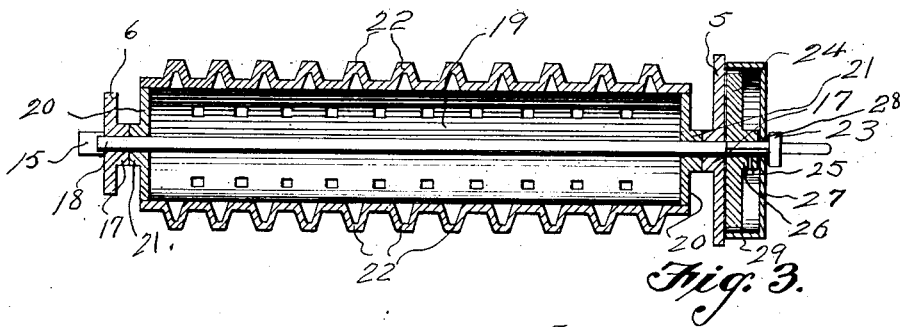
Fig. 3 is a horizontal sectional view on the line 3—3 of Fig. 1.
Figure 4:
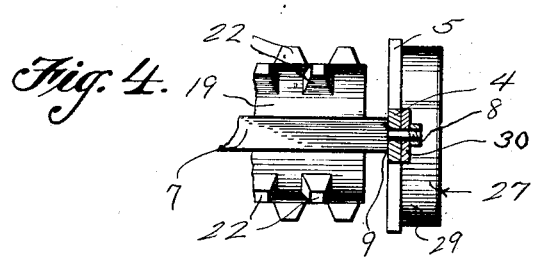
Fig. 4 is a detail sectional view on the line 4—4 of Fig. 1.

Referring more particularly to the accompanying drawings, there is provided a frame comprising end plates 5 and 6 connected at their upper ends by a flat tie bar 7 having its extremities reduced and passed through holes in the end plates. Said extremities are threaded for engagement thereon of nuts 8 whereby the upper ends of the plates may be clamped between said nuts and the squared shoulders 9 formed by reducing the extremities of the bar, said shoulders also serving to prevent twisting movement of the upper portions of the plates on the bar. The lower portions of the plates are connected by a tie rod 10 having its ends passed through the plates and having threaded on said ends pairs of jam nuts 11 between which the plates are confined. The plate 5 is provided at its lower end with a pair of depending legs 12 which have their major portions outwardly offset from the edges of the plate and provided at their lower ends each with a pair of inwardly extending lugs 13 through the lower of which is passed a thumb screw 14 whereby, as shown in Fig. 1, the edge of a table or other similar support may be clamped between said lugs. The lower end of the plate 6 is laterally bent into a foot 15 and apertured for the reception of a screw 16 or other fastening element securing it to the table top.

Each of the plates is provided with a pair of vertically alined bearing boxes 17 in which are journaled the ends of a pair of shafts 18 having mounted thereon the crushing rollers 19. These rollers are preferably hollow, having end walls 20 carrying squared hubs 21 for the reception of the shafts, and the peripheries of the rollers are provided with staggered series of blunt teeth 22, which substantially define alternate elevations and depressions that are in meshing relation at the meeting edges of the rollers whereby in passing a strip of meat through the rollers, the meat will be crushed, and at the same time provided with a series of cup-like indentations on its top and bottom faces. The lower shaft 18 extends outwardly of its boxing in the plate 5 and carries an operating crank 23.

For driving the upper shaft 18 from the lower shaft, intermeshing gears 24 are mounted on said shafts at the outer side of the plate 5, set screws 25 threaded in the hubs 26 of said gears holding them against undesired movement on the shafts. For housing said gears, a plate 27 is provided having the general contour of the meshed gears, and an aperture 28 in its lower portion receiving the projected end of the lower shaft 18. This plate is provided with peripheral inturned flanges 29 seating against the plate 5 and is secured against displacement by the hub 26 of the crank 23 and by an upwardly extending lug 30 engaged by the nut 8 on the projecting end of the upper tie bar, 7. These elements only need to be removed in order to take off the gear housing and gain access to the gears; and the end plate 5 does not have to be provided with additional openings or elements for the attachment of the housing.

By the foregoing construction an exceedingly simple device is thus provided which possesses requisite strength for the operating strains to which it would be subjected, and which may be assembled and disassembled in the most ready manner, simply by removing the securing nuts of the members connecting the end plates 5 and 6.

It is further noted that by securement of the transversely spaced lugs of the plate 5 to a table member or other support, and by engagement of the foot plate 6 on said support, to which it may be secured, the support is utilized as a brace preventing possible distortion of the frame upon the occurrence of operative stresses therein.

What is claimed is:—

1. In an organized mechanism including a frame, shafts journaled through and geared together forward of said frame, driving means on one shaft forward of its gear, and a bar projecting forward beyond said frame and having a nut; a gear housing comprising a plate having a hole to surround the drive shaft between its gear and driving means, an inturned peripheral flange on the plate to inclose the gears, and an apertured lug on the flange to be engaged by said bar and nut.

2. The combination with parallel frame plates having alined bearings, drive and driven shafts journaled in the bearings of one plate and projecting through those of the other, intermeshing gears fast on their projecting ends, and a tie bar connected with one plate and projecting through the other; of a gear housing having a hole through which the drive shaft projects, the housing covering both gears and the other shaft and having a flange inclosing the gears and a lug engaged by the projecting end of said bar, and driving means whose hub is mounted on the drive shaft outside the housing and holds said housing against displacement.

In testimony whereof, I affix my signature, in the presence of two witnesses.

CHARLES ROBBINS.

Witnesses:
 NOAH G. ROSBOROUGH,
 J. N. ROSBOROUGH.